United States Patent
Jones et al.

(10) Patent No.: US 12,180,333 B2
(45) Date of Patent: Dec. 31, 2024

(54) COPOLYESTERS DERIVED FROM ALIPHATIC GLYCOLS, AROMATIC DICARBOXYLIC ACIDS AND POLY(ALKYLENE-OXIDES) AND FILMS MADE THEREFROM

(71) Applicant: Mylar Specialty Films U.S. Limited Partnership, Chester, VA (US)

(72) Inventors: Stephen Jones, Wilton (GB); Stephen Sankey, Wilton (GB); Lucien Schosseler, Luxembourg (LU); Megan Meaburn, Wilton (GB); David Turner, Wilton (GB)

(73) Assignee: Mylar Specialty Films U.S. Limited Partnership, Chester, VA (US)

( * ) Notice: Subject to any disclaimer, the term of this patent is extended or adjusted under 35 U.S.C. 154(b) by 1018 days.

(21) Appl. No.: 17/040,459

(22) PCT Filed: Mar. 28, 2019

(86) PCT No.: PCT/GB2019/050894
§ 371 (c)(1),
(2) Date: Sep. 22, 2020

(87) PCT Pub. No.: WO2019/186173
PCT Pub. Date: Oct. 3, 2019

(65) Prior Publication Data
US 2021/0024688 A1    Jan. 28, 2021

(30) Foreign Application Priority Data
Mar. 28, 2018 (GB) ..................... 1804961

(51) Int. Cl.
*C08G 63/68* (2006.01)
*C08G 63/672* (2006.01)
*C08J 5/22* (2006.01)
*C08K 5/098* (2006.01)
*H01M 10/0525* (2010.01)
*H01M 10/056* (2010.01)
*H01M 50/414* (2021.01)
*H01M 50/446* (2021.01)

(52) U.S. Cl.
CPC ......... *C08G 63/681* (2013.01); *C08G 63/672* (2013.01); *C08J 5/2256* (2013.01); *C08K 5/098* (2013.01); *H01M 10/0525* (2013.01); *H01M 10/056* (2013.01); *H01M 50/414* (2021.01); *H01M 50/446* (2021.01); *C08J 2367/02* (2013.01); *C08J 2371/02* (2013.01); *H01M 2300/0082* (2013.01); *H01M 2300/0091* (2013.01)

(58) Field of Classification Search
CPC ............ H01M 10/056; H01M 50/446; H01M 2300/0082; H01M 2300/0091; C08G 63/672; C08G 63/681; C08J 2367/02; C08J 2371/02
See application file for complete search history.

(56) References Cited

U.S. PATENT DOCUMENTS

| | | |
|---|---|---|
| 5,138,024 A | 8/1992 | Brozek et al. |
| 5,786,318 A | 7/1998 | Blokzijl et al. |
| 5,882,800 A | 3/1999 | Brennan et al. |
| 2003/0220456 A1* | 11/2003 | Kaku ............... C08L 67/02 525/419 |
| 2008/0103217 A1 | 5/2008 | Sunkara |
| 2009/0117362 A1 | 5/2009 | Schosseler et al. |

FOREIGN PATENT DOCUMENTS

| | | | |
|---|---|---|---|
| CN | 103509175 A | | 1/2014 |
| EP | 1 504 059 B1 | | 6/2006 |
| EP | 2 108 673 A1 | | 10/2009 |
| JP | H03-64353 A | | 3/1991 |
| JP | H04-136027 | * | 5/1992 |
| JP | H07-62118 A | | 3/1995 |
| JP | H09-208678 | * | 8/1997 |
| JP | 2017-132989 A | | 8/2017 |
| WO | WO 2017-005903 | * | 1/2017 |
| WO | WO 2017/005903 A1 | | 1/2017 |

OTHER PUBLICATIONS

English translation of JP Publication H09-208678, Aug. 1997.*
English translation of JP Publication H04-136027, May 1992.*
International Search Report and Written Opinion for PCT/GB2019/050894 mailed Jul. 24, 2019.
Karan et al. Solid polymer electrolytes based on polyethylene oxide and lithium trifluoro-methane sulfonate (PEO-LiCF3SO3): Ionic conductivity and dielectric relaxation. Solid State Ion. Aug. 2008;179(19-20):689-96. https://doi.org/10.1016/j.ssi.2008.04.034.
Sepehri et al. Synthesis and characterization of copolymers of poly(ethylene terephthalate) and cyclohexane dimethanol in a semibatch reactor (including the process model). J Appl Poly Sci. Sep. 15, 2009;113(6):3520-32. https://doi.org/10.1002/app.30304.
Zhang et al. Preparation and properties of poly(butylene terephthalate-co-cyclohexanedimethylene terephthalate)-b-poly(ethylene glycol) segmented random copolymers. Polym Deg Stab. Jul. 2004;85(1):559-70. https://doi.org/10.1016/j.polymdegradstab.2003.11.013.

* cited by examiner

*Primary Examiner* — Brittany L Raymond
(74) *Attorney, Agent, or Firm* — Wolf, Greenfield & Sacks, P.C.

(57) ABSTRACT

An optionally oriented copolyester film comprising a copolyester which comprises repeating units derived from an aliphatic diol, an aromatic dicarboxylic acid and a poly (alkylene oxide), wherein the copolyester film further comprises lithium ions, and wherein the film has a thickness of no more than about 25 μm. The copolyester film is suitable for use a separator in a lithium-ion rechargeable battery.

29 Claims, No Drawings

COPOLYESTERS DERIVED FROM ALIPHATIC GLYCOLS, AROMATIC DICARBOXYLIC ACIDS AND POLY(ALKYLENE-OXIDES) AND FILMS MADE THEREFROM

CROSS-REFERENCE TO RELATED APPLICATIONS

This application is a U.S. National Stage patent application based on International Patent Application Serial No. PCT/GB2019/050894, filed Mar. 28, 2019, which claims the benefit of United Kingdom Application No. GB 1804961.9, filed Mar. 28, 2018, each of which is hereby incorporated herein by reference in its entirety.

This invention relates to copolyester compositions and films and other articles made therefrom, and methods for their synthesis. In particular, the present invention is concerned with copolyester compositions and films which exhibit the properties required for use as a separator in lithium-ion solid state batteries.

Lithium-ion batteries are widely used in the field of rechargeable batteries which is set to continually grow over the foreseeable future due, in part, to the increasing demand for consumer electronics and storage of renewable energy. During battery operation (i.e. during charging and discharging), lithium ions are transferred between the anode and cathode. Commercially available lithium-ion batteries are usually provided as wet-cell batteries which contain liquid or gel electrolytes containing lithium salts and a microporous separator. The microporous separator is placed between and in contact with two active solid electrodes. Generally, microporous separators for lithium-ion batteries have a thickness of about 20 μm to about 25 μm and are based on drawn polyolefin films (particularly polyethylene and polypropylene). The separator enables the movement of the liquid or gel electrolyte through its pores, thereby enabling movement of the lithium ions, but prevents direct electric contact between the anode and cathode in the battery. However, there remain concerns about the safety of wet-cell lithium-ion batteries, which have been known to catch fire or even explode. The porous network can lead to growth of lithium dendrites between the anode and cathode, which can result in short-circuiting of the battery, thermal run-away and flammability. The flammability risk is exacerbated by the relatively low glass transition and melting temperatures of these polyolefins. A further disadvantage of polyolefin films as separators is the relatively low mechanical strength, particularly the relatively low tensile strength in the transverse direction of a biaxially drawn film.

Dry-cell batteries have been developed which reduce some of the above safety concerns. These dry-cell batteries contain a solid separator between the cathode and anode, which prevents contact between the electrodes and provides a physical barrier to the growth of dendrites. In dry-cell batteries, the potentially flammable liquid electrolyte is eliminated. Thus, the separator must effectively function as both separator and electrolyte, and so for lithium-ion batteries the separator must enable migration of the lithium ions within its structure. Such lithium-conductive solid separators can be broadly categorised into two groups. The first group focuses on the use of inorganic lithium-ion conductors based on ceramics such as LiPON (lithium phosphorous oxynitride, $Li_2PO_2N$), LLTO (lithium lanthanum titan oxide) or LGPS ($Li_{10}GeP_2S_{12}$). Such inorganic lithium-ion conductors are provided as thin films, which are commonly deposited using sputtering methods. However, deposition rates are low and processing is limited to coin batteries which have small surfaces. Typically, conductivities of up to $10^{-1}$ $Scm^{-1}$ are possible with ceramic conductors. The second group focuses on the use of polymeric films with polyethylene oxide (PEO) as a basic polymer and a lithium salt such as $LiClO_4$, although conductivities at room temperature are generally inferior to ceramic conductors.

Furthermore, during battery operation, the volume of the anodes and cathodes change. Thus, the separator needs to accommodate these variations in volume. If the separator is too rigid, it may be damaged during the charging and discharging cycles or have limited cycling capability.

WO-2017/005903-A discloses cast thick films of a solid polymer electrolyte comprising a thermoplastic block elastomer and an inorganic metal salt and their use as separators in lithium-ion rechargeable batteries. The thermoplastic block elastomer contains polyester, polyamide or diamide hard blocks and ionically conductive soft blocks of polyalkylene oxide. The polyester blocks are preferably derived from butylene terephthalate, and the polyalkylene oxide blocks are incorporated at a concentration of more than 50 wt % of the elastomer. The polymers described are pure block copolymers, i.e. the hard and soft blocks are not distributed randomly but are highly ordered (corresponding to block polymers with a B value of 0 as described herein). The highly ordered nature of these pure block copolymers means that the polymers are highly crystalline.

WO-2017/005903-A discloses that the solid polymer electrolyte has a total plasticizer content of less than 15 wt %. However, the presence of plasticizer, as well as adding cost, could adversely affect other desired properties of the film, such as conductivity. Furthermore, the plasticizer could leach from the film separator during use, which could adversely impact the battery.

The thick films exemplified in WO-2017/005903-A have a thickness of from 200 to 500 μm. However, the use of thick separator films is disadvantageous because it is desirable for separators to be as thin as possible in order to increase energy density and/or to minimize the size of the batteries. The thick films in this document are prepared by a cast process. Typically, films formed by a cast process are less mechanically robust than oriented films formed by an orientation process (e.g., wherein the film is stretched in one or more directions).

US-2009/0117362-A1 discloses breathable bi-axially oriented films comprising a polymeric mixture based on at least one polyether block copolymer and at least one polyester. There is no suggestion in this document that the films disclosed therein could also contain lithium ions or could be used as battery separators.

U.S. Pat. No. 5,882,800 discloses a polymeric film with a substrate layer of polyester material and an antistatic layer containing a polyester/polyalkylene oxide copolymer and a salt, the ratio by weight of copolymer/salt being in the range from 0.1 to 100/1. The copolymer is preferably a polyethylene terephthalate/polyethylene oxide block copolymer and the salt is preferably an alkali metal salt. The film is said to have low surface resistivity, even at low relative humidity.

U.S. Pat. No. 5,138,024 discloses a copolyester synthesized by reacting a dialkyl ester of an aromatic dicarboxylic acid (e.g., dimethyl terephthalate) with ethylene glycol, low molecular weight poly(ethylene glycol) and a salt of a sulfonic acid-substituted aromatic dicarboxylate (e.g., sodium sulfoisophthalic acid) simultaneously in a first stage reaction in the presence of a phosphite or phosphate stabilizer. The intermediate product of the first stage is further reacted in a second stage in the presence of a polycondensation catalyst to obtain a random copolyester of the desired molecular weight. The copolyester is extruded to form a film which, after orientation and heat setting, is said to have excellent clarity and is said to be useful as a photographic film support.

JP 07-62118 discloses a film which is said to have gas barrier properties and pinhole resistance. The polyester film consists of a dicarboxylic acid component based on an aromatic dicarboxylic acid or its esterifiable derivative, and a diol component based on ethylene glycol and containing from 0.5 to 10 wt % polyethylene glycol of a number-average molecular weight ($M_n$) of 500-6000. The film has a melting point higher than 250° C., a haze of less than 10% and an oxygen permeability of less than 1000 ml/m$^2$ per 24 hr.

It is an object of the present invention to address one or more of the aforementioned problems. In particular, it is an object of the present invention to provide improved compositions and films as separators in a lithium-ion solid state battery i.e. the dry cell arrangement noted above or in a lithium-ion battery that comprises liquid electrolytes. It is a particular object to provide improved compositions and films as separators in a lithium-ion solid state battery. It is a particular object to provide compositions and films which at least maintain and preferably improve the conductivities of existing lithium-conductive separators, especially lithium-conductive solid separators, and/or which exhibit good mechanical strength and dimensional stability at low thicknesses. It is a particular object of the present invention to compositions and films which at least maintain and preferably improve the conductivities of existing lithium-conductive separators, especially lithium-conductive solid separators, which exhibit good mechanical strength and dimensional stability at low thicknesses, while ensuring good processability (particularly melt processability) of the composition and ease of film formation.

According to a first aspect of the present invention, there is provided a copolyester film comprising a copolyester which comprises repeating units derived from an aliphatic diol, an aromatic dicarboxylic acid and a poly(alkylene oxide), wherein the copolyester film further comprises lithium ions, and wherein the film has a thickness of no more than 25 μm.

The copolyester films of the invention are suitable as a solid electrolyte. Thus, the copolyester films exhibits volume conductivity rather than merely surface conductivity. The inventors have surprisingly found that the films of the present invention are suitable as solid separators which exhibit an excellent combination of good conductivity and high mechanical strength at low thicknesses, while remaining easy to form with good processability of the composition from which the film is derived. Such separators exhibit excellent dimensional stability, particularly at elevated temperatures, and are able to tolerate the volume variations of electrodes during typical battery cycling.

As used herein, the term "copolyester" refers to a polymer which comprises ester linkages and which is derived from three or more types of comonomers. The copolyesters described herein are thermoplastic.

The aromatic dicarboxylic acid of the copolyester is preferably selected from terephthalic acid and naphthalene dicarboxylic acid. Other aromatic dicarboxylic acids which may be used in the present invention include isophthalic acid and phthalic acid. The naphthalene-dicarboxylic acid can be selected from 2,5-, 2,6- or 2,7-naphthalene dicarboxylic acid. Preferably, the aromatic dicarboxylic acid used in the present invention is terephthalic acid.

The aliphatic diol of the copolyester is preferably selected from $C_2$, $C_3$ or $C_4$ aliphatic diols, more preferably from ethylene glycol, 1,3-propanediol and 1,4-butanediol, more preferably from ethylene glycol and 1,4-butanediol, and more preferably ethylene glycol.

The poly(alkylene oxide) of the copolyester is preferably selected from $C_2$ to $C_{15}$, preferably $C_2$ to $C_{10}$, preferably $C_2$ to $C_6$ alkylene chains. The poly(alkylene oxide) may be selected from polyethylene glycol (PEG), polypropylene glycol (PPG) and poly(tetramethylene oxide) glycol (PTMO), preferably polyethylene glycol. Ethylene oxide-terminated poly(propylene oxide) segments may also be used. Mixtures of poly(alkylene oxide)s can be used, and in one embodiment the copolyester comprises only one type of poly(alkylene oxide) residue.

The weight average molecular weight ($M_W$) of the poly(alkylene oxide) is preferably from about 200 g/mol to 20000 g/mol, preferably from about 200 g/mol to 5000 g/mol, preferably no more than about 3500 g/mol, preferably no more than about 3450 g/mol, preferably from about 400 g/mol to 3350 g/mol, preferably at least about 500 g/mol, preferably from about 500 g/mol to 2200 g/mol, most preferably from about 500 g/mol to 1500 g/mol, preferably from about 800 g/mol to about 1200 g/mol and preferably about 1000 g/mol. The weight average molecular weight ($M_W$) of the poly(alkylene oxide) is preferably at least about 200 g/mol, preferably at least about 400 g/mol, preferably at least about 500 g/mol, and preferably at least about 800 g/mol, for example at least about 1000 g/mol. The weight average molecular weight ($M_W$) of the poly(alkylene oxide) is preferably no more than about 20000 g/mol, preferably no more than about 5000 g/mol, preferably no more than about 3500 g/mol, and preferably no more than about 2200 g/mol, for example no more than about 1500 g/mol.

It has been found that if the molecular weight of the poly(alkylene oxide) is too high, it becomes harder to co-polymerise with the dicarboxylic acid and aliphatic diol to form a copolyester with a sufficiently high melt viscosity for reliable film formation in. In addition, it has been found that if the molecular weight of the poly(alkylene oxide) is too high, the conductivity may decrease, as described below.

Unless the context clearly indicates otherwise the term molecular weight as used herein refers to weight average molecular weight ($M_w$) which is measured by the method as described herein.

The number average molecular weight ($M_n$) may also be used to characterise the poly(alkylene oxide) described herein. The number average molecular weight ($M_n$) of the poly(alkylene oxide) is preferably from about 150 g/mol to 15000 g/mol, preferably from about 150 g/mol to 4000 g/mol, preferably no more than about 3000 g/mol, preferably from about 300 g/mol to 3000 g/mol, preferably at least about 400 g/mol, preferably from about 400 g/mol to 2000 g/mol, most preferably from about 400 g/mol to 1300 g/mol, preferably from about 700 g/mol to about 1000 g/mol and preferably about 800 g/mol. The number average molecular weight ($M_n$) of the poly(alkylene oxide) is preferably at least about 150 g/mol, preferably at least about 300 g/mol, preferably at least about 400 g/mol, and preferably at least about 700 g/mol, for example about 800 g/mol. The number average molecular weight ($M_n$) of the poly(alkylene oxide) is preferably no more than about 18000 g/mol, preferably no more than about 4000 g/mol, preferably no more than about 3000 g/mol, and preferably no more than about 2000 g/mol, for example no more than about 1300 g/mol.

The polydispersity index, PDI, (or dispersity, D) is defined as $M_w/M_n$. The polydispersity index is a measure of the uniformity (or heterogeneity) of the size of the different macromolecules that comprise a polymer (which is a mixture of macromolecules of different sizes). Compositions with a polydispersity index of 1 (i.e. which are monodisperse) consist of macromolecules each of which has the same size (such as dendrimers). Monodisperse compositions of macromolecules are typically made by non-polymerisation processes and are typically not referred to as polymers.

The poly(alkylene oxide) of the copolyester preferably has a polydispersity index of above 1, preferably at least about 1.01, preferably at least about 1.1, preferably at least about 1.2, and preferably no more than about 2.0, preferably no more than about 1.8, preferably no more than about 1.6, and preferably from about 1.01 to about 2.0, preferably about 1.1 to about 1.8, and preferably about 1.2 to about 1.6. Once the $M_w$ and $M_n$ values are known, the PDI may be determined.

The copolyesters may be block (segmented) copolymers comprising alternating random-length sequences joined by ester linkages. Such copolyesters exhibit semi-crystalline (or hard) segments derived from an aromatic dicarboxylic acid and an aliphatic diol, and amorphous (or soft) segments derived from poly(alkylene oxide). Hard segments are made up of repeating units of [$R_1$—O—C(=O)-A-C(=O)—O] wherein $R_1$ is derived from the aliphatic diol and A is the aromatic ring (preferably phenyl or naphthyl) derived from the aromatic dicarboxylic acid defined hereinabove. Soft segments are made up of repeating units of [R—O] where R is the alkylene chain from the poly(alkylene oxide). The soft segments may be end-capped with said aromatic dicarboxylic acid via an ester linkage.

In a further embodiment, the copolyesters are random copolymers, in which the aromatic dicarboxylic acid, aliphatic diol and poly(alkylene oxide) units are arranged in a random sequence in the copolyester backbone.

Between these two extremes of random and block copolymers lie copolyesters which are referred to herein as "block-like" copolymers. In the block-like copolymers, the poly(alkylene oxide) units are interspersed between the aromatic dicarboxylic acid units to a greater degree than in the block copolymers, such that the crystalline (or hard) segments noted above are, on average, significantly shorter than in the block copolymers. The sequence of the comonomer units in the copolymer chain, i.e. the degree of randomness of the copolyester, may be determined using conventional techniques known in the art, and preferably by $^{13}$C NMR spectroscopy as described herein. The copolyester can be characterised as a block, block-like or random copolyester by quantifying the degree of randomness, B, with a value of 0 representing a pure block copolymer and a value of 1 representing a statistically random copolymer as defined by a Bernoulli model.

Preferably, B is in the range of from about 0.1 to 1.0, preferably from about 0.2 to about 0.95, preferably from about 0.3 to about 0.9, preferably from about 0.4 to about 0.8, for example from about 0.5 to about 0.7. The copolyester preferably has a value of B of at least about 0.1, preferably at least about 0.2, preferably at least about 0.3, and preferably at least about 0.4, for example at least about 0.5. The copolyester preferably has a value of B of no more than 1.0, preferably no more than about 0.95, preferably no more than about 0.9, preferably no more than about 0.8, and preferably no more than about 0.7.

Preferably, the copolymers of the present invention are the "block-like" copolyesters or the random copolyesters.

More preferably, the copolymers of the present invention are the "block-like" copolyesters, which are obtainable by selecting the molecular weight for the poly(alkylene oxide) as described herein.

It has been found that the molecular weight of the poly(alkylene oxide) has a significant influence on the sequence of the comonomers in the copolymer, and the characterisation of the copolymer as a block, block-like or random copolymer. Thus, lower molecular weight poly (alkylene oxide)s favour the formation of random copolymers, and higher molecular weight poly(alkylene oxide)s favour the formation of block copolymers. Block copolymers typically exhibit a greater tendency to crystallise and a higher melting temperature, relative to the corresponding random copolymers. Higher melting temperatures are preferably avoided in the present invention, since they require higher processing temperatures and there is a greater risk of degradation. In addition, it is preferred in the present invention to avoid the increased tendency of the pure block copolymers to crystallise, since this may hinder the migration of lithium ions within the structure of the copolymer and may reduce its conductivity.

In the present invention, the fraction of repeating units derived from aromatic dicarboxylic acid and poly(alkylene oxide) is defined as $S_\omega$ (or soft weight), which is the total molecular weight of these amorphous (or soft) segments as a percentage of the total molecular weight of the copolyester. The fraction of repeating units derived from aromatic dicarboxylic acid and aliphatic diol is defined as $H_\omega$ (or hard weight), which is the total molecular weight of these semi-crystalline (or hard) segments as a percentage of the total molecular weight of the copolyester. In other words, these soft and hard weight fractions are calculated using the following equations:

$$\text{Soft weight \% } (S_\omega) = (\omega_{TA\text{-}PEG}) \times 100$$

$$\text{Hard weight \% } (H_\omega) = (\omega_{TA\text{-}EG}) \times 100$$

wherein $\omega_{TA\text{-}PEG}$ and $\omega_{TA\text{-}EG}$ are the mass fractions of terephthalic units covalently bound to poly(alkylene oxide), and terephthalic units covalently bound to aliphatic diol, respectively, of the total mass of the copolyester.

Preferably, $S_\omega$ is in the range of from about 5 to about 70%, preferably from about 5 to about 50%, preferably from about 10 to about 50%, preferably from about 10 to about 40%, preferably from about 10 to about 30%, preferably at least 5%, preferably at least 10%, preferably at least 15%, preferably at least 20%, preferably at least 25%, preferably no more than 70%, preferably no more than 50%, preferably no more than 40%, preferably no more than 30%.

While it is known that increasing the amount of poly (alkylene oxide) in the copolyester generally increases the conductivity, the inventors have found that if too much poly(alkylene oxide) is incorporated into the copolyester, the melt viscosity becomes too low for reliable film formation and the more difficult it becomes to complete the polymerisation of the poly(alkylene oxide) into the copolyester. The inventors have also found that copolyesters with higher amounts of poly(alkylene oxide)s exhibit a greater tendency to crystallise, which appears to adversely affect the conductivity of the final film.

Preferably, the copolyester film is substantially free of plasticizer. Preferably, the total amount by weight of plasticizer (if present) is no more than 15%, preferably no more than 10%, preferably no more than 5%, preferably no more than 2% based of the weight of film being 100%. Preferably, the total amount by weight of plasticizer is about 0% (e.g.

being absent) based of the weight of film being 100%. A plasticizer is a material which is added to a composition to reduce its viscosity, flexibility, workability and/or stretchability. Materials that might act to plasticize the copolyester films of the present invention are well known to those skilled in the art. Advantageously, the amount of plasticizer used in preparing the polyester films of the invention can be reduced or in a preferred embodiment eliminated completely.

The copolyester films of the present invention further comprise lithium ions. The lithium ions are suitably present in, and held within, the polymeric matrix of the film by virtue of the interaction between the lithium cation and the negatively charged oxygen atoms.

The lithium ions may be derived from one or more types of lithium salt.

When determining suitable lithium salts, the solubility, conductivity, electrochemical and thermal stability, and cost should be considered. Any suitable lithium salt may be used, but preferably the lithium salts are selected from lithium salts of:
  (i) aromatic carboxylic acids, preferably aromatic dicarboxylic acids, preferably terephthalic acid;
  (ii) aliphatic carboxylic acids, including aliphatic dicarboxylic acids, preferably acetic acid, glycolic acid or succinic acid;
  (iii) carbonic acids;
  (iv) phenolic acids, preferably salicylic acid;
  (v) mineral acids, such as perchloric acid or phosphoric acid, particularly phosphoric acid; and
  (vi) boric acids, preferably bis(oxalate)boric acid.

Optionally, the lithium salts are selected from lithium salts of (i) to (v) provided above.

Thus, suitable lithium salts include: dilithium terephthalate (DLTA), lithium glycolate, lithium benzoate, lithium acetate, lithium carbonate, lithium perchlorate, lithium orthosilicate, lithium phosphate, lithium salicylate, lithium succinate and lithium bis(oxalato)borate.

Preferably the lithium salt is an organic lithium salt.

In a preferred embodiment, the lithium salt is the salt of the aromatic dicarboxylic acid from which the copolyester is derived. Thus, in the case of the preferred copolyesters derived from terephthalic acid, the lithium salt is preferably selected from mono- or di-lithium terephthalate, and preferably dilithium terephthalate. The inventors have found that dilithium terephthalate is particularly preferable for thermal stability and cost reasons.

Other preferred lithium salts may be selected from the alkoxylate esters of the aforementioned acids, particularly the carboxylic acids, particularly the dicarboxylic acids, particularly the aromatic dicarboxylic acids, particularly terephthalic acid. Such alkoxylate esters are preferably derived from the aliphatic diols, preferably from $C_{2-10}$ aliphatic diols, preferably from $C_{2-6}$ aliphatic diols, preferably from $C_2$, $C_3$ or $C_4$ aliphatic diols, more preferably from ethylene glycol, 1,3-propanediol and 1,4-butanediol, more preferably from ethylene glycol.

A particularly suitable lithium salt has the formula (I) below, and is referred to herein as dilithium bis hydroxy ethyl terephthalate (DL-BHET):

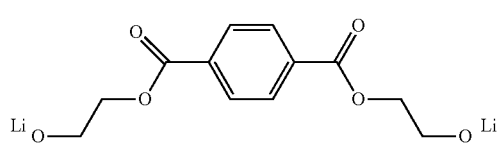

(I)

Other lithium salts include the lithium salts suitable for use in lithium ion batteries, including lithium bis(trifluoromethanesulfonyl)imide (LiTFSI), lithium hexafluorophosphate ($LiPF_6$) and lithium tetrafluoroborate ($LiBF_4$). Also included are lithium thiocyanate (LiSCN), lithium hexafluoroarsenate ($LiAsF_6$), lithium trifluoromethanesulfonate ($LiCF_3SO_3$), lithium bromide (LiBr), lithium iodide (LiI), lithium bis(trifluoromethanesulfonimide) ($LiN(CF_3SO_2)_2$), lithium tris(trifluoromethylsulfonyl)methide ($LiC(CF_3SO_2)_3$), lithium orthosilicate, lithium trifluoroacetate ($LiCF_3CO_2$) and lithium bis(fluorosulfite)amide ($LiN(FO_2S)_2$).

Preferably the lithium salt is selected from dilithium terephthalate.

In one embodiment, the lithium ions are held within the polymeric matrix of the film by virtue of the interaction between the lithium cation and the polarisable electronegative oxygen atoms of the copolyester, preferably at least the electronegative oxygen atoms of the polyalkylene oxide units.

In a preferred embodiment, however, the lithium ions are held within the polymeric matrix of the film by virtue of the interaction between the lithium cations and the anion of a lithium salt. Thus, in this embodiment, the copolyester film comprises a lithium salt. In other words, lithium ions present in the film are in the form of a lithium salt. Preferably at least part, preferably at least 50 wt %, preferably at least 60 wt %, preferably at least 70 wt %, preferably at least 80 wt %, preferably at least 90 wt %, preferably at least 95 wt %, preferably at least 99 wt %, and preferably substantially all of the lithium ions present are in the form of a lithium salt. The lithium salt is preferably the lithium salt from which the lithium ions are derived. The lithium salts are selected from the lithium salts described above, and the preferences described above apply here. Thus, in this preferred embodiment, a lithium salt is held within the polymeric matrix. In this embodiment, the lithium salt is not part of the polymer backbone, i.e. it has surprisingly not been polymerised into the copolyester. In other words, in this preferred embodiment, the anion of the lithium salt is not covalently bound to the copolyester. In the preferred embodiment described above in which the lithium salt is the salt of the same aromatic dicarboxylic acid from which the copolyester is derived, it is believed that the surprising thermal stability of the lithium-containing copolyester film described herein results from the alignment of the morphology of the copolyester with the morphology of the lithium salt.

The amount of lithium ions present in the copolyester composition or copolyester film is preferably effective to provide an Li:O molar ratio of from about 5:1 to about 1:50, preferably from about 4:1 to about 1:50, preferably from about 3:1 to about 1:50, preferably from about 2:1 to about 1:50, preferably about 1:1 to about 1:40, preferably about 1:2 to about 1:30, preferably about 1:4 to about 1:25, wherein the number of O atoms in this ratio is defined as the number of O atoms in the poly(alkylene oxide) residue.

Preferably, the lithium ion, is present in amounts of no more than about 5.0 wt % by total weight of the copolyester composition or copolyester film, preferably no more than about 3.5 wt %, preferably no more than about 2.0 wt %, preferably no more than about 1.5 wt %, and preferably at least about 0.01%, preferably at least about 0.05%, preferably at least about 0.10 wt %, preferably at least about 0.25 wt %, and preferably from about 0.01 wt % to about 5.0 wt %, preferably from about 0.05 wt % to about 3.5 wt %, preferably from about 0.10 wt % to about 2.0 wt %, preferably from about 0.25 wt % to about 1.5 wt %.

If too much lithium is incorporated then the viscosity becomes undesirably high, which reduces processability of the melt, making film formation difficult in a conventional film-forming process, and may also lead to a reduction in the molecular weight of the final copolyester.

It will be appreciated that the aliphatic diol, aromatic dicarboxylic acid and poly(alkylene oxide) repeating units of the lithium-containing copolyester, as described hereinabove, together preferably constitute at least 96 wt %, preferably at least 97 wt % and preferably at least 98 wt % by total weight of said copolyester.

According to a second aspect of the present invention, there is provided a copolyester composition comprising a copolyester which comprises repeating units derived from an aliphatic diol, an aromatic dicarboxylic acid and a poly (alkylene oxide), wherein the copolyester composition further comprises lithium ions, wherein
  (i) the fraction ($S_W$) of repeating units derived from aromatic dicarboxylic acid and poly(alkylene oxide), as defined hereinabove, is in the range of from about 5 to about 50%; and/or
  (ii) the lithium ions are held within the polymeric matrix of the composition by virtue of the interaction between the lithium cations and the anion of a lithium salt which is not covalently bound to the copolyester.

The preferences and elements described in respect of the first aspect of the invention apply equally to the second aspect of the invention.

The copolyesters and copolyester compositions described herein can be synthesised according to conventional techniques for the manufacture of polyester materials. Thus, the copolyester may be made by a first step of direct esterification or trans-esterification, followed by a second step of polycondensation. In the direct esterification embodiment, the aliphatic diol and aromatic dicarboxylic acid are reacted directly, typically under elevated temperature (typically about 150 to 260° C.) and pressure (typically about 40 psi) in the presence of a base (e.g. sodium hydroxide), and with the water by-product of the direct esterification reaction being distilled off, to form a bis(hydroxyalkyl)carboxylate. Once the direct esterification reaction is complete, a stabiliser (e.g. phosphoric acid) is added to neutralise the base. In an alternative embodiment, the copolyester is prepared by the trans-esterification route, which preferably comprises heating an ester of the aromatic dicarboxylic acid (suitably a lower alkyl ($C_{1-4}$) ester, preferably the dimethyl ester) with a molar excess of the aliphatic diol at elevated temperature (typically in the range of about 150 to 260° C.) in the presence of a basic esterification catalyst (e g manganese (II) acetate tetrahydrate, $Mn(OAc)_2 \cdot 4H_2O$), and with the methanol by-product of the trans-esterification reaction being distilled off, to form a bis(hydroxyalkyl)carboxylate. Polymerisation is effected in a polycondensation step which is conducted using an appropriate catalyst, usually antimony trioxide, at elevated temperature (typically about 290° C.) and typically under reduced pressure (for instance about 1 mm Hg), with continuous distillation of by-product(s). The poly(alkylene oxide) may be present at the start of the synthetic procedure, since the dicarboxylic acid or dicarboxylic acid ester starting material typically reacts selectively with the aliphatic diol rather than the poly(alkylene oxide), particularly as the molecular weight of the poly (alkylene oxide) increases. Preferably, however, the poly (alkylene oxide) is added at the start of the polycondensation step.

Preferably, the synthetic procedure further comprises a solid phase polymerisation (SSP) step to increase the molecular weight of the copolyester and increase and/or complete the polymerisation of the poly(alkylene oxide) into the copolyester.

Thus, the product of the polycondensation reaction is preferably subjected to an SSP step. The solid phase polymerisation may be carried out in a fluidised bed, e.g. fluidised with nitrogen, or in a vacuum fluidised bed, using a rotary vacuum drier. Suitable solid phase polymerisation techniques are disclosed in, for example, EP-A-0419400 the disclosure of which is incorporated herein by reference. Thus, SSP is typically conducted at a temperature which is 10-50° C. below the crystalline melting point ($T_M$) of the polymer but higher than the glass transition temperature ($T_g$) (or where the copolyester exhibits multiple glass transition temperatures, higher than the highest glass transition temperature). An inert atmosphere of dry nitrogen or a vacuum is used to prevent degradation. In a preferred embodiment, solid phase polymerisation is carried out over 16 hours at 220° C. under vacuum.

The inventors have found that as the SSP reaction time is increased, there is a decrease in the total amount of extractables in the copolyester and the relative amount of unreacted poly(alkylene oxide) in the extracted material.

The total extractables content of the copolyester film or copolyester composition is preferably less than 5%, preferably less than 3%, preferably less than 2%, preferably less than 1% by total weight of the copolyester film or copolyester composition, respectively, prior to the extraction.

The extent to which the poly(alkylene oxide) starting material has copolymerised into the copolyester is defined herein as the parameter "PAG copolymerisation", and can be calculated from the amount of poly(alkylene oxide) starting material and the amount of poly(alkylene oxide) in the total extractables content:

$$PAG \text{ copolymerisation } (\%) = \left( \frac{\omega_{PAG-FEED} - \omega_{PAG-EXTRACT}}{\omega_{PAG-FEED}} \right) \times 100$$

wherein $\omega_{PAG-FEED}$ and $\omega_{PAG-EXTRACT}$ are the mass fractions of poly(alkylene oxide) starting material and the amount of poly(alkylene oxide) in the total extractables content, respectively. The amount of unreacted poly(alkylene oxide) in the total extractables content may be determined by conventional analytical techniques, and preferably by $^1H$ NMR spectroscopy.

Preferably, the PAG copolymerisation is at least 95%, preferably at least 96%, preferably at least 97%, preferably at least 98%, preferably at least 99%.

Thus, according to a third aspect of the invention, there is provided a process for preparing a copolyester composition as defined herein, wherein said process comprises the steps of:
  (i) reacting said aliphatic diol with said aromatic dicarboxylic acid or an ester thereof (suitably a lower alkyl ($C_{1-4}$) ester, preferably the dimethyl ester), to form a bis(hydroxyalkyl)-ester of said aromatic dicarboxylic acid;
  (ii) polymerising in a polycondensation reaction said bis(hydroxyalkyl)-ester of said aromatic dicarboxylic acid in the presence of the poly(alkylene oxide), suitably under conditions of elevated temperature in the presence of a catalyst, for instance as exemplified in Scheme (1) herein below; and
  (iii) preferably subjecting the reaction product of step (ii) to solid state polymerisation.

It will be appreciated that the preferences and elements described in respect of the first and second aspects apply equally to the third aspect.

The lithium ions may be introduced into the copolyester composition either during synthesis of the copolyester, or during a separate compounding step in which the copolyester is compounded with a lithium salt.

The lithium salt is preferably introduced during synthesis of the copolyester. Typically, not all of the lithium salt, starting material is incorporated into the final copolyester during the synthesis, and the inventors have found from about 60 to about 80% of the lithium salt used as starting material becomes incorporated into the copolyester is typical.

In a preferred embodiment, the lithium salt is added to the reactant(s) at the start of the synthetic procedure.

In an alternative embodiment, the lithium salt is added to the reaction product of the direct esterification or trans-esterification step (i), and before the polymerisation stage, enabling the lithium salt to be present in the copolyester.

In a further embodiment, the lithium salt is added at the end of polymerisation, preferably after completion of step (ii) and prior to any solid state polymerisation, by mixing the lithium salt into the copolyester melt.

The melt viscosity of the lithium-containing copolyester or copolyester composition from which the film is derived is preferably at least about 100 Pa·s, preferably not more than about 1000 Pa·s, preferably not more than about 500 Pa·s, preferably not more than about 300 Pa·s, preferably not more than about 250 Pa·s, and preferably about 150 Pa·s, at the desired processing temperature. Typical processing temperatures at which the copolyester should exhibit such melt viscosities are those used in the manufacture of the film described herein, and are preferably in the range of 200 to 290° C., particularly 220 to 280° C., and preferably at 275° C., and/or wherein the copolyester exhibits such melt viscosities at a temperature within the range of $T_M$ to $T_M+10°$ C. wherein $T_M$ is the crystalline melting temperature of the copolyester. A melt viscosity which is too high can lead to difficulties in film manufacture and/or reduce the molecular weight of the final copolyester and/or increase the cost of film manufacture, for instance because of the need to utilise specialised film-forming equipment. In addition, a melt viscosity which is too high may require a reduction in the output rate of the extruder, thereby decreasing the efficiency and economy of manufacture, or require an increase to the extrusion temperature in order to reduce the viscosity of the melt (which in turn can lead to thermal degradation of the polymer and the loss of associated properties), in order to achieve stable film production. A melt viscosity which is too low can lead to difficulties in reliable film formation and stretching.

The copolyester films of the present invention are preferably oriented copolyester films, preferably biaxially oriented copolyester films.

The optionally oriented films of the present invention are self-supporting films, i.e. they are capable of independent existence in the absence of a supporting base.

Formation of the film may be effected by conventional extrusion techniques well-known in the art. In general terms the process comprises the steps of extruding a layer of molten lithium-containing, copolyester at a temperature within a range appropriate to the melting temperature of the copolyester, for instance in a range of from about 280 to about 300° C. (or, typically, no more than about 10° C. higher than the crystalline melting point of the copolyester), quenching the extrudate and orienting the quenched extrudate.

Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. Biaxial orientation may be effected by simultaneous orientation or by sequential orientation. Preferably simultaneous orientation is effected.

Simultaneous biaxial orientation may be effected, for instance, in a tubular process by extruding a thermoplastics polyester tube which is subsequently quenched, reheated and then expanded by internal gas pressure to induce transverse orientation, and withdrawn at a rate which will induce longitudinal orientation. Particularly suitable simultaneous biaxial orientation processes are disclosed in EP-2108673-A and US-2009/0117362-A1, the disclosure of which processes is incorporated herein by reference.

Another preferred technique is a flat film process in which the film-forming copolyester is extruded through a slot die and rapidly quenched upon a chilled casting drum to ensure that the copolyester is quenched to the amorphous state. Orientation is then effected by stretching the quenched extrudate in at least one direction at a temperature above the glass transition temperature(s) of the copolyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus.

Stretching is generally effected so that the dimension of the oriented film is from 2 to 7, preferably from 2 to 5, more preferably 2.5 to 4.5, more preferably 3.0 to 4.5, more preferably 3.5 to 4.5 times its original dimension in the or each direction of stretching. Stretching is conventionally effected at temperatures higher than the $T_g$ of the copolyester composition, preferably at least about 5° C. higher, preferably at least about 15° C. higher than the $T_g$, and preferably in the range of from about $T_g+5°$ C. to about $T_g+75°$ C., preferably from about $T_g+5°$ C. to about $T_g+30°$ C. Thus, typically stretching is effected at temperatures in the range of about 5 to about 155° C., preferably about 5 to about 110° C. Greater draw ratios (for example, up to about 8 times) may be used if orientation in only one direction is required. It is not necessary to stretch equally in the machine and transverse directions although this is preferred if balanced properties are desired.

Preferably, a simultaneous biaxial stretching process is used, which is particularly advantageous for making the thin films of the present invention. Stretching and orientation of the copolyester film improves the mechanical properties of the copolyester film and preferably can also improve the conductivity of the copolyester film.

A stretched film may be, and preferably is, dimensionally stabilised by heat-setting under dimensional support at a temperature above the glass transition temperature(s) of the copolyester but below the melting temperature ($T_M$) thereof, to induce the desired crystallinity of the copolyester. During the heat-setting, a small amount of dimensional relaxation may be performed in the transverse direction (TD) and/or machine direction (MD). The dimensional relaxation of up to 10%, more typically up to about 8%. Dimensional relaxation in the transverse direction is referred to in the art as "toe-in", and typically involves a dimensional shrinkage of up to about 5%, typically from about 2 to about 4%. Dimensional relaxation in the machine direction may be effected by conventional techniques, although it is a relatively more difficult process to achieve since low line tensions are required particularly in a sequential orientation process. For this reason, a simultaneous orientation process is preferably used where MD relaxation is desired and, in this embodiment, simultaneous relaxation in the MD and TD is typically effected. The actual heat-set temperature and time will vary depending on the composition of the film and its desired final thermal shrinkage but should not be selected so as to substantially degrade the toughness properties of the film such as tear resistance. Within these constraints, preferred films are heat-set at a temperature from about 80° C. less than the melting temperature of the film (i.e. $T_M$–80° C.) to about 10° C. less than $T_M$ (i.e. $T_M$–10° C.), preferably from about $T_M$–70° C. to about $T_M$–20° C. Thus, the heat-set temperature is suitably in the range of from about 130 to about 245° C., preferably from about 150 to about 245° C., and preferably at least 180° C., preferably in the range of 190 to 230° C. After heat-setting the film is typically quenched rapidly in order induce the desired crystallinity of the copolyester.

In one embodiment, particularly where the film has been oriented in a sequential orientation process, the film may be further stabilized through use of an in-line relaxation stage. Alternatively the relaxation treatment can be performed off-line. The relaxation of the film is between 0% and 10%, preferably 5%. In this additional step, the film is heated at a temperature lower than that of the heat-setting stage, and with a much reduced MD and TD tension. For a relaxation process which controls the film speed, the reduction in film speed (and therefore the strain relaxation) is typically in the range 0 to 2.5%, preferably 0.5 to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135 to 250° C. is generally desirable, preferably 150 to 230° C., more preferably 170 to 200° C. The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

Advantageously, the film may be and preferably is manufactured in air, i.e. wherein the film is not manufactured (including the steps of extrusion, casting and stretching) under the atmosphere of an inert gas (such as nitrogen or a noble gas such as argon). Thus, the copolyester compositions and films described herein are surprisingly thermally stable, and do not require any special handling conditions, in particular an inert atmosphere, during manufacture or storage.

The thickness of the film is preferably at least about 0.3 μm, preferably at least about 0.5 μm, preferably at least about 0.9 μm. Typically, the thickness of the film is at least about 1.0 μm, typically at least about 1.5 μm, typically at least about 2.0 μm.

The thickness of the film is no more than 25 μm, preferably no more than about 20 μm, preferably no more than about 18 μm, preferably no more than about 15 μm, preferably no more than about 12 μm, preferably no more than about 9 μm, preferably no more than about 7 μm, preferably no more than about 5 μm.

The thickness of the film may be advantageously from about 0.3 μm to 25 μm, preferably from about 0.3 μm to about 20 μm, preferably from about 0.3 μm to about 18 μm, preferably from about 0.5 μm to about 15 μm, preferably from about 0.9 μm to about 12 μm, typically from about 1.0 μm to about 9 μm, typically from about 1.5 μm to about 7 μm, typically from about from about 2.0 μm to about 5 μm.

The lithium-containing copolyester is preferably the major component of the film, and makes up at least 65%, preferably at least 75%, preferably at least 85%, and preferably at least 95%, preferably at least 98% by weight of the total weight of the film. Said copolyester is preferably the only polyester present in the film.

The film may further comprise any other additive conventionally employed in the manufacture of polyester films. Thus, agents such as anti-oxidants, UV-absorbers, hydrolysis stabilisers, cross-linking agents, dyes, fillers, pigments, voiding agents, lubricants, radical scavengers, thermal stabilisers, flame retardants and inhibitors, anti-blocking agents, surface active agents, slip aids, gloss improvers, prodegradents, viscosity modifiers and dispersion stabilisers may be incorporated as appropriate. Such additives may be introduced into the copolyester composition in a conventional manner. For example, the additive(s) may be introduced by mixing with the monomeric reactants from which the film-forming copolyester composition is derived, or the additive(s) may be mixed with the copolyester composition by tumble or dry blending or by compounding in an extruder, followed by cooling and, usually, comminution into granules or chips. Masterbatching technology may also be employed.

The film may, in particular, comprise a particulate filler which can improve handling and windability during manufacture and any downstream processing. The particulate filler may, for example, be a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). To provide acceptable handling and windability, fillers are typically used in only small amounts, generally such that the total weight of filler is not more than about 6.0%, preferably not more than about 4.0%, preferably not more than about 2.5%, preferably not more than about 2.0%, preferably not more than about 1.0%, more typically no more than about 0.6% and preferably no more than about 0.3% by weight, based on the weight of the copolyester in the film. The inorganic filler should have a particle size which is smaller than the film thickness, and preferably the particle size is preferably no more than 10 μm, preferably no more than about 5 μm, preferably no more than about 2 μm, preferably in the range of from about 0.5 μm to about 2.0 μm.

As used herein, the term "particle size" refers to the volume distributed median particle diameter (equivalent spherical diameter corresponding to 50% of the volume of all the particles, read on the cumulative distribution curve relating volume % to the diameter of the particles—often referred to as the "D(v,0.5)" value) thereof. Particle size of the particles may be measured by electron microscope, coulter counter, sedimentation analysis and static or dynamic light scattering. Techniques based on laser light diffraction (Fraunhofer diffraction) are preferred. A particularly preferred method utilises a Mastersizer (e.g. a 3000)

available from Malvern. The median particle size may be determined by plotting a cumulative distribution curve representing the percentage of particle volume below chosen particle sizes and measuring the 50th percentile. The modality of the particulate filler size distributions is not limited, and may be mono-modal, bi-modal or tri-modal.

In a preferred embodiment, the film comprises an antioxidant. A range of antioxidants may be used, such as antioxidants which function by trapping radicals or by decomposing peroxide. Suitable radical-trapping antioxidants include hindered phenols, secondary aromatic amines and hindered amines, such as Tinuvin™ 770 (Ciba-Geigy). Suitable peroxide-decomposing antioxidants include trivalent phosphorous compounds, such as phosphonites, phosphites (e.g. triphenyl phosphate and trialkylphosphites) and thiosynergists (e.g. esters of thiodipropionic acid, such as dilauryl thiodipropionate). Hindered phenol antioxidants are preferred. A particularly preferred hindered phenol is tetrakis-(methylene 3-(4'-hydroxy-3',5'-di-t-butylphenyl propionate) methane, which is commercially available as Irganox™ 1010 (Ciba-Geigy). Other suitable commercially available hindered phenols include Irganox™ 1035, 1076, 1098 and 1330 (Ciba-Geigy), Santanox™ R (Monsanto), Cyanox™ antioxidants (American Cyanamid) and Goodrite™ antioxidants (BF Goodrich). The concentration of antioxidant present in the film is preferably in the range from 50 ppm to 5000 ppm, more preferably in the range from 300 ppm to 1500 ppm, particularly in the range from 400 ppm to 1200 ppm, and especially in the range from 450 ppm to 600 ppm based on the weight of the copolyester. A mixture of more than one antioxidant may be used, in which case the total concentration thereof is preferably within the aforementioned ranges. Incorporation of the antioxidant into the copolyester may be effected by conventional techniques, and preferably by mixing with the monomeric reactants from which the copolyester is derived, particularly at the end of the direct esterification or ester exchange reaction, prior to polycondensation.

Preferably the conductivity of the film is at least about $10^{-13}$ S/cm, preferably at least about $10^{-12}$ S/cm, preferably at least about $10^{-11}$ S/cm, preferably at least about $10^{-10}$ S/cm, preferably at least about $10^{-8}$ S/cm, preferably at least about $10^{-6}$ S/cm, preferably at least about $10^{-5}$ S/cm, measured at 100° C., and preferably measured at 25° C. and 100° C.

The film should have low shrinkage, preferably less than 10.0%, preferably less than 5.0%, preferably less than 4.0%, preferably less than 3.0%, preferably less than 2.0%, preferably less than 1.0%, after 30 mins at 100° C. Preferably such low shrinkage values are exhibited in both dimensions of the film (i.e. the machine and transverse dimensions).

Preferably the crystalline melting point ($T_m$) of the film is greater than 175° C., preferably greater than 200° C., preferably greater than 210° C., preferably greater than 220° C. In comparison, polyolefin films generally used as microporous separators for lithium-ion, batteries typically have a crystalline melting point ($T_m$) of about 130° C. to 150° C. This relative increase in $T_m$ is advantageous as the films described herein could therefore be used in applications which require higher operating temperatures. Preferably the crystalline melting point ($T_m$) of the film is not more than 270° C.

Preferably, the film of the present invention exhibits a glass transition temperature ($T_g$) of no more than about 50° C., preferably no more than about 45° C., preferably no more than about 40° C. In the present invention, a lower $T_g$ is preferred since it promotes greater conductivity at the operating temperature of the film in the preferred end-use described herein. The films of the present invention typically exhibit a $T_g$ of at least about −50° C.

The films described herein are particularly suitable as solid separators in a lithium-ion rechargeable battery.

According to a fourth aspect of the invention, there is provided a lithium-ion rechargeable battery comprising the copolyester film described herein, wherein said battery comprises an anode, a cathode and a separator between the anode and the cathode, wherein said separator is the copolyester film described herein.

It will be appreciated that the preferences and elements described in respect of the first, second and third aspects apply equally to the fourth aspect.

During use and operation of the rechargeable battery, the lithium ions present in the polymeric matrix of the copolyester film are mobile, enabling the separator to exhibit the required conductivity.

In a preferred embodiment, one or both of the anode and cathode may comprise a metallised polyester film comprising a polymeric film substrate and a conductive metal layer, preferably wherein the polymeric film support is a polyester film.

According to a fifth aspect of the invention, there is provided the use of the copolyester film and/or copolyester composition described herein in batteries and/or components thereof, and particularly there is provided the use of the copolyester film described herein as a separator in batteries. As described herein, said separator is placed between and in contact with two active solid electrodes in the battery, i.e. the anode and cathode Preferably, the battery is a lithium-ion rechargeable battery.

It will be appreciated that the preferences and elements described in respect of the first, second, third and fourth aspects apply equally to the fifth aspect.

According to an sixth aspect of the invention, there is provided a method of manufacturing a lithium ion rechargeable battery, using the copolyester film and/or copolyester composition as described herein, the method comprising the steps of:
  (a) preparing or obtaining a separator using the copolyester film and/or the copolyester composition;
  (b) assembling the lithium-ion rechargeable battery, wherein the battery comprises an anode, a cathode and a separator between the anode and the cathode, wherein said separator is obtained from step (a).

In a preferred embodiment, the separator is the copolyester film as described herein.

It will be appreciated that the preferences and elements described in respect of the first to fifth aspects apply equally to the sixth aspect.

The following test methods were used to characterise the properties of the novel compounds disclosed herein.
(i) Glass Transition Temperature ($T_g$), Crystalline Temperature ($T_c$) and Crystalline Melting Point ($T_m$)
  These thermal parameters were measured by differential scanning calorimetry (DSC) using a PerkinElmer HyperDSC 8500. Unless otherwise stated, measurements were made according to the following standard test method and based on the method described in ASTM E1356-98. The sample was maintained under an atmosphere of dry nitrogen for the duration of the scan. A flow rate of 20 ml min$^{-1}$ and Al pans were used. Samples (5 mg) were initially heated at 20° C. min$^{-1}$ from 20° C. to 350° C. in order to erase the previous thermal history (1$^{st}$ heating scan). After an isothermal hold at 350° C. for 2 min, samples were cooled at 20° C. min$^{-1}$ to 20° C. (1$^{st}$ cooling scan). Samples were then reheated at 20° C. min$^{-1}$ to 350° C. (2$^{nd}$ heating scan). Values of $T_g$ and $T_M$ were obtained from 2$^{nd}$ heating scans. As is well known, the glass transition temperature of a polymer is the temperature at which it changes from a glassy, brittle state to a plastic, rubbery state.

The value of a $T_g$ was determined as the extrapolated onset temperature of the glass transition observed on the DSC scans (heat flow (W/g) against temperature (° C.)), as described in ASTM E1356-98. It will be appreciated that the copolyesters of the present invention may be associated with two $T_g$ values, one $T_g$ for the soft segments and one $T_g$ for the hard segments.

The values of $T_c$ and $T_m$ were determined from the DSC scans as the peak exotherm or endotherm of the transition.

(ii) Melt Viscosity

The term "melt viscosity" as used herein means the complex viscosity of a polymer measured at a particular melt temperature and a particular frequency of oscillation. The complex viscosity was measured by rotational rheology testing using a TA Instruments DHR-1 according to the following test method. Polymer samples (2.5 g) were dried under dynamic vacuum at 140° C. for 16 h. The samples were then held between 2×25 mm diameter parallel plates and heated to the required temperature under a nitrogen atmosphere. Analysis of the complex viscosity of the polymer was performed via a temperature ramp method, whereby samples were heated at a rate of 4° C. min$^{-1}$, at constant strain (5%) and angular frequency (10 rad s$^{-1}$).

(iii) Through-Film Ionic Conductivity (Dry/Solid State Setup)

The through-film ionic conductivity of film samples with no additional electrolyte present, i.e. in the dry solid state setup, was determined by dielectric spectroscopy using a Novontrol Alpha AL® spectrometer in the frequency range from 10$^{-3}$ to 100 Hz and over a temperature range of from 25 to 100° C. Polymer samples (100-200 g) were pressed under a Teflon™ sheet at 280° C. to form plates with thicknesses between 150-300 µm. The samples were sputtered with gold to ensure good contact between the film samples and the electrodes of the measuring device. A sample was clamped between a pair of stainless steel electrodes and heated in air. The dielectric properties were measured as a function of frequency. The sample is subject to an AC voltage (preferably 1 V) and the current response, in phase, represents the resistivity or loss factor ε" while the permittivity ε' gives the capacitive part of the response. The complex dielectric permittivity ε* is provided as the sum of ε' and ε". As the sample was heated, both ε" and permittivity ε' were measured at different frequencies in the range of 10$^{-3}$ to 10$^{2}$ Hz over this temperature range. The AC conductivity σ was calculated from ε" using the formula:

$$\sigma = 2\pi f \varepsilon_0 \varepsilon''$$

where f is the frequency of the AC voltage applied to the sample and $\varepsilon_o$ is the permittivity of free space (8.85·10$^{-14}$ F cm$^{-1}$). The AC conductivity is plotted as a graph of conductivity (y axis) versus the applied frequency (x axis) and such plots exhibit a plateau region where the conductivity is independent of the applied frequency, which is taken as the DC conductivity (see N. K. Karan et al, Solid States Ionics, 179 (2008), 689-696, the disclosure of which test method is incorporated herein by reference). It is the plateau region, and the DC conductivity which it represents, which is used herein as a measure of the through-film ionic conductivity of the films of the present invention. The conductivity is expressed in Siemens/cm, usually in the form of its logarithm (base 10).

(iv) Molecular Weight ($M_w$)

GPC measurements were performed on a Malvern/Viscotek TDA 301 using an Agilent PL HFIPgel guard column plus 2×30 cm PL HFIPgel columns. A solution of HFIP with 25 mM NaTFAc was used as eluent, with a nominal flow rate of 0.8 mL min$^{-1}$. All experimental runs were conducted at 40° C., employing a refractive index detector. Molecular weights are referenced to polymethylmethacrylate calibrants. Data capture and subsequent data analysis were carried out using Omnisec software. Samples were prepared at a concentration of 2 mg mL$^{-1}$, with 20 mg of sample dissolved in 10 mL eluent. These solutions were stirred for 24 h at room temperature and then warmed at 40° C. for 30 mins to fully dissolve the polymer. Each sample was filtered through a 0.45 µm polytetrafluoroethylene membrane prior to injection.

Determination of $M_n$ is made using the GPC measurement described herein.

Once the $M_w$ and $M_n$ values are known, the PDI is determined.

(v) Thermal Stability

The thermal stability of the copolymers was assessed by thermogravimetric analysis. The samples were analysed on a Mettler Toledo TGA1 in Al$_2$O$_3$ pans (40 µL capacity) under a nitrogen purge. Polymer samples (5 mg) were equilibrated at 20° C. before being heated to 600° C. at 10° C. min$^{-1}$. The thermal stability is assessed by measuring the thermal degradation temperature, $T_d$, which is defined as the temperature at which 10% mass loss has occurred.

(vi) Thermal Shrinkage

Shrinkage was assessed for film samples (preferably having dimensions 200 mm×10 mm) which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the longer dimension of the test sample is oriented along the machine direction of the film. After heating the specimen to the predetermined temperature (by placing in a heated oven at that temperature) and holding for the predetermined interval, it was cooled to room temperature and its dimensions re-measured manually. The thermal shrinkage was calculated and expressed as a percentage of the original length.

(vii) Amount of Lithium in the Copolyester

The lithium concentration in the compositions and films was determined by inductively coupled plasma optical emission spectroscopy (ICP-OES), according to an UKAS 17025 accredited method. Samples (0.1 g) were digested in boiling sulfuric acid, oxidised with hydrogen peroxide and made to a known volume. The solution was further diluted and the lithium content was determined with reference to matrix matched standards using a PerkinElmer Optima 7500DV spectrometer.

(viii) Extractables Content

The Soxhlet extraction method is commonly identified as a continuous extraction technique, whereby the partially soluble components of a solid are transferred to a liquid solvent by means of a Soxhlet extractor. In the present invention, this method is utilised for the quantification of residual low molecular weight material, oligomers and/or unreacted comonomers which may be present after synthesis of the copolyesters. Polymer samples (15 g) were dried under vacuum at 65-70° C. for 16 h, prior to reflux for 6 h in xylene (200 mL) within Quickfit Soxhlet extraction apparatus consisting of: 250 mL round bottom flask; Whatman cellulose extraction thimble; double surface Davies condensers; and Soxhlet extractor jacketed body. Excess xylene was removed under vacuum at reduced pressure, to afford the extracted material. The total extractables content is expressed as an average of 2 measurements in percentage form, via the ratio of extracted material against starting polymer mass:

$$\text{Extractables (\%)} = \left(\frac{\text{Extracted mass}}{\text{Sample mass}}\right) * 100$$

The composition of the extractables content, and particularly the amount of unreacted poly(alkylene oxide) can then be determined by conventional analytical techniques, and preferably by $^1$H NMR spectroscopy.

(ix) Level of Poly(Alkylene Oxide) in the Copolyester

1H NMR spectroscopy was used to determine the level of poly(alkylene oxide) in the copolyester, using an ECS400 spectrometer at 80° C., referenced to residual solvent (d$_2$-TCE (1,1,2,2-tetrachloroethane)) resonances.

(x) Degree of Randomness

The comonomer sequence distributions, and thus the degree of randomness of such, were analysed by $^{13}$C NMR spectroscopy using an ECS400 spectrometer at 80° C., referenced to residual solvent (d$_2$-TCE (1,1,2,2-tetrachloroethane)) resonances. The degree of randomness may be determined following analysis of the dyad ratios present in a copolymer (see Y. Zhang, Z. Feng, Q. Feng and F. Cui, *Polym. Deg. Stab.*, 2004, 85, 559-570, and S. Sepehri, M. Rafizadeh and F. Afshar-Taromi, *J. Appl. Sci.*, 2009, 113, 3520-3523). In the context of the copolyesters of the present invention, the resonances associated with the aromatic dicarboxylic acid (in a $^{13}$C NMR spectra may be assigned to four dyads, denoted as $f_{EG-T-EG}$, $f_{EG-T-PEG}$; $f_{PEG-T-EG}$, and $f_{PEG-T-PEG}$, where T, EG and PEG are the aromatic dicarboxylic acid (preferably terephthalic acid) residues, aliphatic diol (preferably ethylene diol) residues and poly(alkylene oxide) (preferably PEG) residues present in the copolymer, respectively. The molar fractions for the hard and soft segments, denoted as $X_{EG}$ and $X_{PEG}$, may be calculated as:

$$X_{EG} = \frac{f_{EG-T-PEG} + f_{PEG-T-EG}}{2} + f_{EG-T-EG}$$

$$X_{PEG} = \frac{f_{PEG-T-EG} + f_{EG-T-PEG}}{2} + f_{PEG-T-PEG}$$

Furthermore, the probability of an aromatic dicarboxylic acid residue being situated between hard and soft segments, i.e. present within an alternating sequence, is denoted as $P_{AB}$, and may be calculated as:

$$P_{EG-T-PEG} = \frac{f_{EG-T-PEG} + f_{PEG-T-EG}}{2X_{EG}}$$

$$P_{PEG-T-EG} = \frac{f_{PEG-T-EG} + f_{EG-T-PEG}}{2X_{PEG}}$$

The degree of randomness, denoted as B, is defined as:

$$B = P_{EG-T-PEG} + P_{PEG-T-EG}$$

The invention is further illustrated by the following examples. It will be appreciated that the examples are for illustrative purposes only and are not intended to limit the invention as described above.

Modification of detail may be made without departing from the scope of the invention. The prefix C or COMP before an example indicates that it is comparative.

EXAMPLES

An illustrative reaction scheme to prepare copolyesters of the present invention is shown in Scheme 1 below.

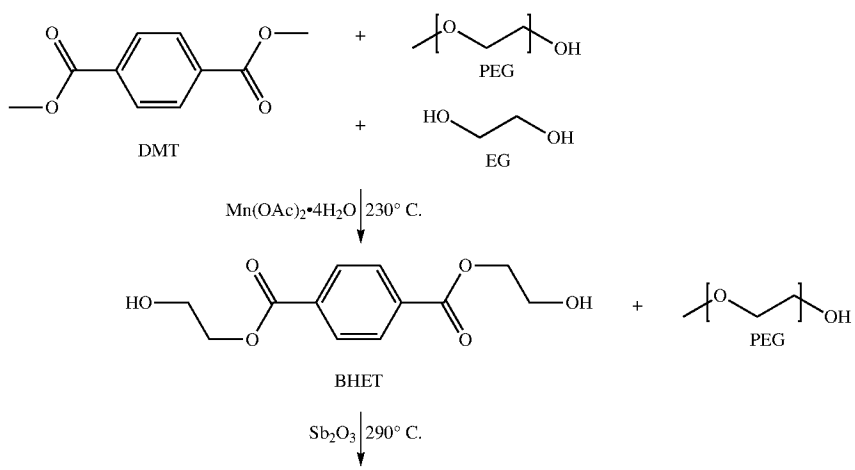

-continued

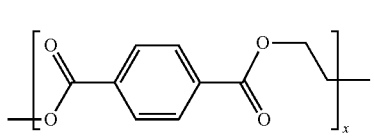 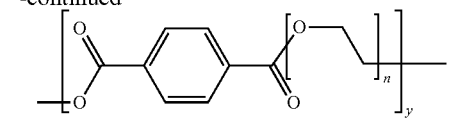

PET.PEG

Scheme 1: Synthesis of the bis(hydroxyalkyl)-ester of an aromatic dicarboxylic acid and subsequent polycondensation in the presence of a poly(alkylene oxide) to give a copolyester as described herein. The lithium salt (not shown in the scheme) is added at the start of the synthesis.

Experiment 1

A preliminary series of copolyesters was made using ethylene glycol, terephthalic acid, polyethylene glycol (PEG4000) and dilithium terephthalate (DLTA), as set out in Table 1, to investigate the effects of PEG and lithium on the melt processability and conductivity of the copolyester. The copolyester compositions were made by reacting terephthalic acid and dilithium terephtalate with ethylene glycol under pressure (about 40 psi) at high temperature (about 240° C.). A trace of sodium hydroxide was added to prevent the formation of unwanted by-products, and the esterification reaction proceeded without the need of a catalyst. Water was distilled off from the reaction and the reaction stopped once 90% of the theoretical weight of water from the reaction had been collected. Phosphoric acid stabiliser was added to neutralise the base. Polyethylene glycol was then added and polycondensation was effected with an antimony trioxide catalyst at about 290° C., and wherein the pressure above the melt was reduced to less than 1 mm Hg. As the polycondensation reaction proceeded, the viscosity of the batch increased, and once a pre-determined viscosity had been achieved the polymerisation reaction was stopped by restoring the pressure in the vessel back to atmosphere. The copolyester compositions were then extruded as a lace and cast into a water bath, dried and pelletized. The thermal properties, melt viscosity and conductivity were measured and the results are shown in Table 1 below (in which "n/a" means "not applicable"; and "n/m" means "not measured").

These initial results demonstrated that lithium ions can be successfully incorporated into a polyethylene terephthalate (PET) polyester to provide a conductive material. Sample 1 shows that lithium incorporation leads to an increase in the melt viscosity, but this increase can be counter-balanced by the decrease in melt viscosity which results from the copolymerisation of PEG into the lithium-containing polyesters (sample 2), while retaining the thermal properties within acceptable levels. However, the inventors have found that if the amount of PEG is too high and/or if the weight average molecular weight ($M_w$) of PEG is too high, the lower melt viscosity may make it harder to reliably form film in a conventional film-forming apparatus. The inventors also observed that the copolymerisation of PEG increased the melt conductivity of the lithium-containing polymer, which the inventors believe is due to an increase in the mobility of lithium ions within the polymer morphology.

Experiment 2

A second series of copolyesters was made using ethylene glycol, terephthalic acid, polyethylene glycol (PEG1000) and dilithium terephthalate, with the addition of 0.1 g of antioxidant (Irganox® 1010). The amounts of the reactants are shown in Table 2, in which BHET refers to bis(hydroxyethyl)terephthalate and DLTA refers to dilithium terephthalate. The copolyester compositions were made generally in accordance with Scheme 1 above via trans-esterification followed by polycondensation, using 0.1 g of an $Sb_2O_3$ catalyst. The reaction products were subjected to solid state polymerisation over 24 hours at 200° C. under dynamic vacuum. The copolyester compositions were then extruded as a lace and cast into a water bath, dried and pelletized. The $T_g$, $T_m$, $T_d$ and melt viscosity were measured prior to solid state polymerisation and the results are shown in the Table, along with the conductivity, extractables content and randomness of the copolyester.

TABLE 1

| Sample | TA added (g) | EG added (g) | PEG added (g) | DLTA added (g) | Soft wt % in final polymer (wt %) | Li content in feed (wt %) | Li in final polymer (wt %) | Li/O molar ratio | $T_g$; $T_m$; $T_d$ (° C.) | Melt Viscosity (Pa·S) at 275° C. | Log $\sigma^{DC}$ (S cm$^{-1}$) at 100° C. |
|---|---|---|---|---|---|---|---|---|---|---|---|
| PET control (COMP A) | 2250 | 1000 | 0 | 0 | n/a | n/a | n/a | n/a | 82.34; 249.31; 420 | 217 | −14.72 |
| 1 | 4537 | 2860 | 0 | 1513 | n/a | 2.25 | 1.65 | n/a | 78.17; 255.62; 414 | 370 | −14.30 |
| 2 | 4537 | 2860 | 1030 | 1513 | 16.00 | 1.84 | 1.52 | 0.64 | 24.59; 254.85; 406 | 41 | −9.92 |
| 3 | 5551 | 2640 | 777 | 0 | n/m | 0.00 | 0.00 | n/a | 44.21; 243.59; n/m | 155 | −12.07 |
| 4 | 5330 | 2640 | 777 | 220 | 5.62 | 0.34 | n/m | n/m | 40.86; 248.38; n/m | 159 | −11.79 |
| 5 | 5050 | 2640 | 1000 | 501 | 27.00 | 0.49 | n/m | n/m | 28.24; 226.38; n/m | 121 | n/m |

TABLE 2

| Sample | BHET added (g) | PEG added (g) | DLTA added (g) | Soft wt % in final polymer (wt %) | Li content in feed (wt %) | Li in final polymer (wt %) | Li/O molar ratio | $T_g$; $T_m$; $T_d$ (° C.) | Melt Viscosity (Pa · S) at 275° C. | Log $\sigma^{DC}$ (S cm$^{-1}$) at 100° C. | Ex-tractables (%) | Degree of random-ness |
|---|---|---|---|---|---|---|---|---|---|---|---|---|
| 6 | 22.60 | 17.5 | 59.90 | 60.02 | 12.08 | 1.84 | 0.10 | −14.15; 58.76 & 209.79; 401 | 12 | −9.33 | 5.60 | 0.719 |
| 7 | 90.20 | 8.62 | 1.18 | 10.10 | 0.12 | 0.04 | 0.03 | 45.53; 238.89; 404 | 128 | −12.09 | nm | n/m |
| 8 | 86.58 | 8.62 | 4.80 | 10.60 | 0.49 | 0.16 | 0.14 | 44.93; 237.49; 404 | 147 | −12.07 | n/m | n/m |
| 9 | 81.54 | 8.62 | 9.84 | 11.30 | 1.06 | 0.32 | 0.19 | 45.51; 238.76; 404 | 145 | −12.28 | n/m | n/m |

TABLE 3

| Sample | TA added (kg) | PEG added (g) | Soft wt % in final polymer (wt %) | $T_g$; $T_m$; $T_d$ (° C.) | Melt Viscosity (Pa · S) at 275° C. | Log $\sigma^{DC}$ (S cm$^{-1}$) at 100° C. | Ex-tractables (%) | Degree of random-ness |
|---|---|---|---|---|---|---|---|---|
| 10 | 2050 | 700 | 15.90 | 38.80; 249.07; 405 | 50 | −9.33 | 2.60 | 0.719 |

As demonstrated by the data in Table 2, copolyesters of the present invention have good thermal properties and through-film ionic conductivity.

Experiment 3

Sample 10 was prepared in a similar manner to that described in Experiment 2. As demonstrated by the data in Table 3, copolyesters of the present invention have good thermal properties and through-film ionic conductivity.

Experiment 4

A third series of copolyesters was made using 1050 kg ethylene glycol, 2050 kg terephthalic acid and 700 kg polyethylene glycol (PEG3450), with the addition of 1300 g of antioxidant (Irganox® 1010). The copolyester compositions were made generally in accordance with Experiment 1, using 1040 g of the $Sb_2O_3$ catalyst. The reaction products were subjected to solid state polymerisation under dynamic vacuum at 210° C. between 0-48 h (see Table 4) and a subsequent Soxhlet extraction in xylenes. The copolyester was determined to have a soft weight, $S_W$, of 15.80% and a degree of randomness, B, of 0.405. The extractables content, the composition of the extractable content and the PEG copolymerisation were measured and calculated as defined herein and the results shown in Table 4.

TABLE 4

| SSP Reaction Time (h) | Ex-tractables Content (%) | Extractables composition (wt %) | | | PEG Copoly-merisation(%) |
|---|---|---|---|---|---|
| | | Cyclic PET | Linear PET | PEG | |
| 0 | 2.60 | 1.07 | 49.71 | 49.22 | 89.34 |
| 16 | 1.05 | 4.81 | 71.95 | 23.24 | 97.97 |
| 24 | 0.67 | 3.64 | 75.00 | 21.36 | 98.81 |
| 30 | 0.42 | 4.19 | 80.59 | 15.22 | 99.47 |

As shown in Table 4, a negative correlation exists between the length of solid state polymerisation reaction time versus the total amount of extractables obtained and the relative amount of unreacted polyethylene glycol in the extracted material. Thus, solid state polymerisation is preferably performed as an additional polymerisation step to aid the copolymerisation of the polyethylene glycol and polyester units.

The invention claimed is:

1. An oriented copolyester film comprising a copolyester which comprises repeating units derived from an aliphatic diol, an aromatic dicarboxylic acid and a poly(alkylene oxide), wherein the copolyester film further comprises lithium ions, wherein the film is a self-supporting film and wherein the film has a thickness of no more than 25 μm;
   wherein said lithium ions are derived from lithium salts selected from lithium salts of:
   (i) carbonic acids;
   (ii) phenolic acids;
   (iii) the aromatic dicarboxylic acid from which the copolyester is derived; or
   (iv) an alkoxylate ester of the aromatic dicarboxylic acid from which the copolyester is derived wherein the alkoxylate ester is derived from the aliphatic diol from which the copolyester is derived.

2. A film according to claim 1, wherein the copolyester is block-like, the repeating units of the copolyester having a degree of randomness denoted by a value of B of from about 0.1 to 0.95.

3. A film according to claim 2, wherein the value of B is from about 0.3 to about 0.9.

4. A film according to claim 1, wherein the film has a thickness of no more than about 20 μm.

5. A film according to claim 1, where the film comprises no plasticiser or comprises less than 15% of any plasticiser by weight of the film.

6. A film according to claim 1, wherein said copolyester comprises semi-crystalline segments derived from an aromatic dicarboxylic acid and an aliphatic glycol, and amorphous segments derived from poly(alkylene oxide).

7. A film according to claim 1, wherein the aliphatic diol is selected from $C_2$, $C_3$ or $C_4$ aliphatic diols.

8. A film according to claim 1, wherein the weight average molecular weight of the poly(alkylene oxide) is from about 200 to about 20000 g/mol.

9. A film according to claim 1, wherein said lithium ions are present in a polymeric matrix of the film by the interaction between the lithium ions and negatively charged oxygen atoms.

10. A film according to claim 1 wherein the copolyester film comprises a lithium salt held within a polymeric matrix.

11. A film according to claim 1, wherein the Li:O molar ratio is from about 5:1 to about 1:50, wherein the number of O atoms in this ratio is defined as the number of O atoms in the poly(alkylene oxide) residue.

12. A film according to claim 1, wherein the melt viscosity of the copolyester from which the film is derived is from about 100 to 1000 Pa·s at 275° C.

13. A film according to claim 1, which further comprises an antioxidant.

14. A film according to claim 1, which exhibits a conductivity of at least about $10^{-13}$ S/cm measured at 100° C.

15. A film according to claim 1, wherein the copolyester is random, the repeating units of the copolyester having a degree of randomness denoted by a value of B of about 1.0.

16. A film according to claim 1, wherein the fraction $S_W$ of repeating units derived from aromatic dicarboxylic acid and poly(alkylene oxide), wherein $S_W$ is defined as the total molecular weight of the amorphous segments as a percentage of the total molecular weight of the copolyester, is in the range of from about 5% to about 70%.

17. A film according to claim 1, wherein the aromatic dicarboxylic acid is selected from naphthalene dicarboxylic acid and terephthalic acid.

18. A film according to claim 1, wherein the poly(alkylene oxide) is selected from polyethylene glycol (PEG) and polypropylene glycol (PPG).

19. A film according to claim 1, wherein said lithium ions are derived from lithium salts selected from lithium salicylate and dilithium bis hydroxy ethyl terephthalate of formula (I),

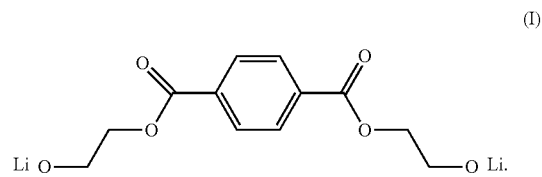

20. A film according to claim 1, wherein the aromatic dicarboxylic acid is terephthalic acid and the lithium salt is dilithium terephthalate.

21. A film according to claim 1, wherein the lithium ions are held within a polymeric matrix of the film by virtue of the interaction between the lithium ions and the anion of a lithium salt which is not covalently bound to the copolyester.

22. A film according to claim 1, wherein the lithium ions are present in an amount of no more than about 5 weight % of the film.

23. A film according to claim 1, wherein the melt viscosity of the copolyester from which the film is derived is from about 100 to 1000 Pa·s at a temperature within the range of $T_M$ to $T_M+10°$ C. wherein $T_M$ is the crystalline melting temperature of the copolyester.

24. A film according to claim 1, which exhibits a shrinkage of less than 5.0% after 30 mins at 100° C. in both dimensions of the film.

25. A film according to claim 1, which is a biaxially oriented film.

26. A film according to claim 1, which has a crystalline melting point ($T_m$) of greater than 175° C.

27. A film according to claim 1, which has a glass transition point ($T_g$) of no more than 50° C.

28. A lithium-ion rechargeable battery comprising an anode, a cathode and a separator between the anode and the cathode, wherein said separator is the copolyester film defined in claim 1.

29. A method of manufacturing a lithium-ion rechargeable battery, as claimed in claim 28 comprising the steps of:
   (a) preparing or obtaining a separator using the copolyester film;
   (b) assembling the lithium-ion rechargeable battery, wherein the battery comprises an anode, a cathode and a separator between the anode and the cathode, wherein said separator is obtained from step (a).

* * * * *